United States Patent

Kejha

[11] Patent Number: 5,712,054
[45] Date of Patent: Jan. 27, 1998

[54] RECHARGEABLE HYDROGEN BATTERY

[75] Inventor: Joseph B. Kejha, Meadowbrook, Pa.

[73] Assignee: Electrion, Inc., Meadowbrook, Pa.

[21] Appl. No.: 582,383

[22] Filed: Jan. 3, 1996

Related U.S. Application Data

[63] Continuation-in-part of Ser. No. 345,471, Jan. 6, 1994, abandoned.

[51] Int. Cl.$^6$ ............................................. H01M 8/06
[52] U.S. Cl. ........................... 429/21; 429/40; 429/46; 429/105; 29/DIG. 4
[58] Field of Search .......................... 429/21, 59, 46, 429/40, 41, 101, 105; 204/DIG. 4

[56] References Cited

U.S. PATENT DOCUMENTS

| | | |
|---|---|---|
| 4,305,793 | 12/1981 | Broniewski . |
| 5,376,470 | 12/1994 | Sprouse ........................... 429/19 |
| 5,407,756 | 4/1995 | Sprouse ........................... 429/12 |

OTHER PUBLICATIONS

Table "Theoretical Voltage and Capacity of Major Battery Systems" from Handbook of Batteries by David Linden 1984 month n/a.
Article "Eternal Airplane" by Stuart Brown Popular Science, Apr. 1994.
Article "Limiting Factors for Carbon–Based Chemical Double Layer Capacitors," Journal of Power Sources, 47 (1994) 303–312 month n/a.

*Primary Examiner*—M. Nuzzolillo

[57] ABSTRACT

A very high gravimetric energy and power density hydrogen ion based rechargeable battery, which stores hydrogen and oxygen in lightweight porous carbon electrodes with metalized current collectors, and which are separated by ionically permeable polymeric membranes containing a liquid electrolyte. The hydrogen and oxygen are produced by electrolysis of water in the battery during charging and the battery cells are enclosed in lightweight, metalized polymer housings of honeycomb construction. The battery is also very highly rechargeable due to the use of carbon and hydrogen.

25 Claims, 4 Drawing Sheets

RECHARGEABLE HYDROGEN BATTERY

CROSS REFERENCE TO RELATED DOCUMENTS

The subject matter of this invention is a CIP of Ser. No. 345,471 filed on Jan. 6, 1994, to Joseph B. Kejha, now abandoned.

BACKGROUND OF THE INVENTION

1. Field of the Invention

The subject invention pertains to hydrogen/oxygen based rechargeable battery for automobiles, motorcycles, and electric vehicles such as cars, boats, airplanes and their hybrids, load leveling energy storage, and for other applications where high energy density and/or high power density and/or long cycle life is desirable. Said battery stores the hydrogen and oxygen produced by electrolysis of water in the battery in carbon based sponges with metalized fiber current collectors, separated by vertical, ionically permeable membranes containing a liquid electrolyte. The cells of said battery are enclosed in lightweight, metalized polymer housing and may need gravity for proper operation.

2. Description of the Prior Art

Prior art rechargeable batteries, which are using hydrogen ions in their electrochemistry, such as nickel-metal hydride, nickel-hydrogen, and nickel-cadmium batteries, as well as lead-acid batteries cycle well and have very good discharge rates or current densities, but they all have relatively low gravimetric energy densities (25 to 80 wh/kg), as well as related low gravimetric power density, due to use of heavy metals and heavy metal oxides in their electrodes, heavy metal current collectors and heavy packaging. They are also very toxic, expensive and they are not environmentally friendly.

The high energy and power density, long cycle life, rechargeable hydrogen battery of the invention does not suffer from the prior art problems and provides many positive advantages.

SUMMARY OF THE INVENTION

It has now been found that high energy and power density, long cycle life, rechargeable battery or cell can be made by utilization of very high energy density hydrogen and oxygen stored in lightweight activated carbon and preferably super-activated carbon, or C60 carbon sponges, separated by ion conductive membrane and containing preferably a liquid electrolyte, and enclosed in a lightweight metalized polymer housing of preferably honeycomb sandwich construction. The carbon sponges are also in contact with a lightweight, metalized polymer or carbon fiber, or other structure current collectors, which are connected to sealed terminals exiting from the housing. The hydrogen and oxygen are produced in the battery by electrolysis of water mixed with an acid, or base, or a salt, and optionally with an antifreeze agent. The water is stored under the carbon sponges in two chambers connected by a tunnel and said chambers contain also electrodes, which may be connected to respective current collectors for proper polarity. When a direct charging current is supplied to the battery terminals it will flow through the current collectors to electrodes submerged in the water and will cause splitting of said water into hydrogen and oxygen at appropriate electrodes. The hydrogen and oxygen gases will rise separately into carbon sponges above them and get absorbed into them. Due to the limited amount of the water available, the battery can not be overcharged. When the battery terminals are connected to an electrical load, the hydrogen ions from the first carbon sponge will start flowing through the membranes with liquid or solid electrolyte to the oxygen in the second carbon sponge and will combine into the water again. The water by effects of gravity will flow back into chambers below, until all the hydrogen and oxygen gases are used up. The battery is then fully discharged. The charging can be then repeated as was described above. Because the hydrogen ions are very small, they can be transported very fast through the electrolyte, resulting in very high rate of discharge, similarly as in the prior art batteries, but because of the described very lightweight materials used in the construction of the battery of the invention, said battery has also very high specific, or gravimetric energy density and power density.

It has been found that hydrogen and carbon are also very good for cycling and that over five thousands of full depth cycles can be achieved. Said battery is very economical to manufacture due to abundance of carbon, water and polymeric materials, which are also environmentally very friendly.

The principle object of the invention is to provide rechargeable battery or cell which has very high gravimetric energy density.

It is a further object of the invention to provide rechargeable battery or cell which has very high gravimetric power density.

It is a further object of the invention to provide rechargeable battery or cell which has an excellent cycleability.

A further object of the invention is to provide a battery which is easy and economical to manufacture.

A further object of the invention is to provide battery which is environmentally friendly.

A further object of the invention is to provide battery for electric vehicles.

A further object of the invention is to provide battery for cranking of engines.

A further object of the invention is to provide battery for military applications.

A further object of the invention is to provide battery for load leveling energy storage and for uninterruptible power supplies.

Other objects and advantageous features of the invention will become apparent from the accompanying description and drawings.

BRIEF DESCRIPTION OF THE DRAWINGS

The nature and characteristic feature of the invention will be more readily understood from the following description taken in connection with the accompanying drawing forming part hereof in which.

Like numerals refer to like parts throughout the several views and figures.

It should, of course be understood, that the description and the drawings herein are merely illustrative, and it will be apparent that various modifications, combinations and changes can be made of the structures disclosed without departing from the spirit of the invention and from the scope of the appended claims.

DESCRIPTION OF THE PREFERRED EMBODIMENTS

When referring to the preferred embodiments, certain terminology will be utilized for the sake of clarity. Use of such terminology is intended to encompass not only the described embodiment, but also all technical equivalents which operate and function in substantially the same way to bring about the same results.

Figure 1:
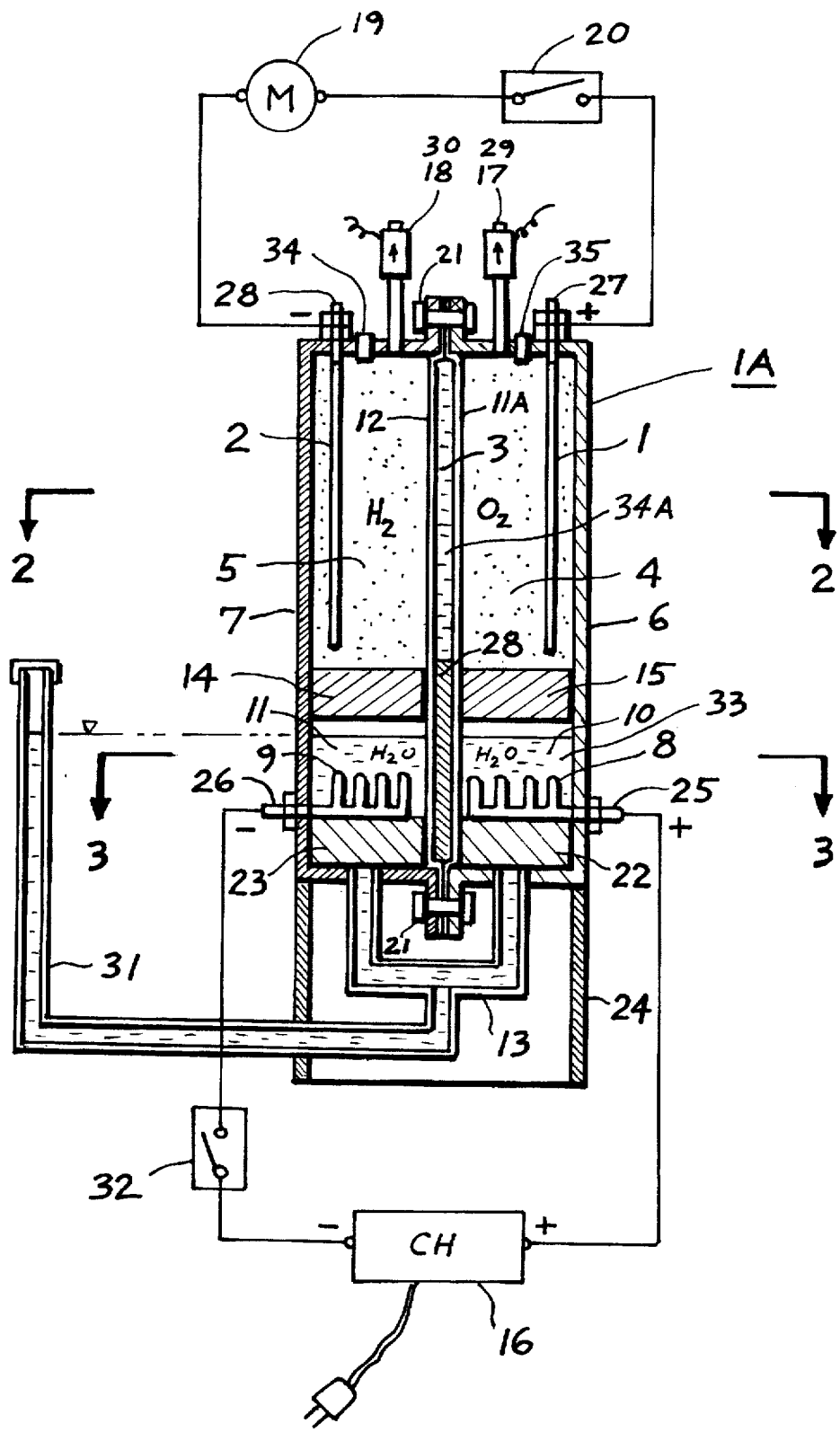
FIG. 1 is a vertical sectional schematic view of the hydrogen battery cell of the invention, showing locations of various components, according to the subject invention.
Figure 2:
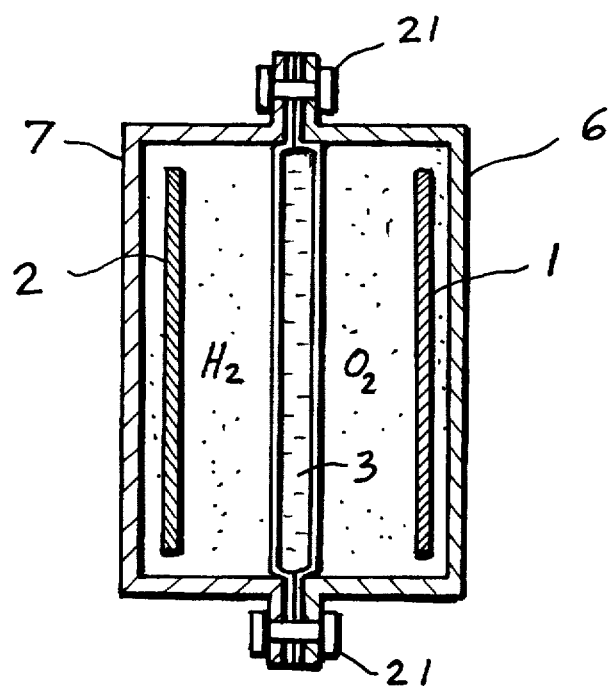
FIG. 2 is a horizontal sectional schematic view taken approximately on the line 2—2 of FIG. 1, showing locations of two half shells of the housing, ion conducting membranes, electrodes and current collectors.
Figure 3:
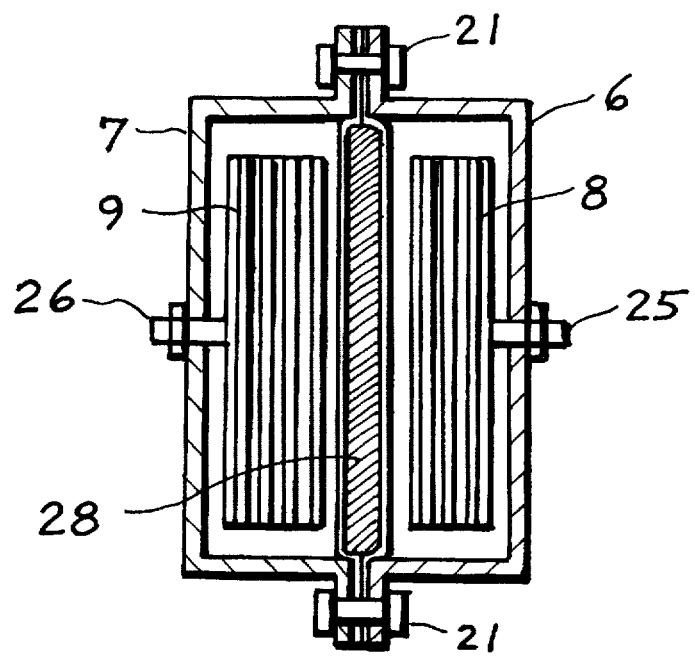
FIG. 3 is another horizontal sectional schematic view taken approximately on the line 3—3 of FIG. 1, showing locations of charging electrodes and a separator plate.

Referring now in more detail particularly to the drawings of this patent and FIGS. 1, 2 and 3, thereof, one embodiment of the hydrogen and oxygen based rechargeable battery cell of the invention 1A comprises, a positive discharging electrode 4 with a current collector 1, a negative discharging electrode 5 with a current collector 2, an electrically insulating and corrosion resistant housing having two halfshells 6 and 7 tied together by bolts 21, a proton exchange membrane or a hydrogen ion conducting membrane 3, electrolyte chambers 10 and 11 interconnected by tube 13, a negative charging electrode 9, a positive charging electrode 8, two porous hard sponge buffers or filters 14 and 15 separating a liquid electrolyte 33 from electrodes 4 and 5, two fibrous porous electrically insulating buffers 22 and 23 (under electrodes 8 and 9) and an electrically insulating separator plate 28—all three preventing the hydrogen and oxygen mixing. Said battery cell may have also pressure check valves 18 and 17 with pressure sensors 29 and 30 controlling the charging switch or relay 32 for power cut off.

The electrodes 4 and 5 contain a carbon powder, which may be a carbon black, or an activated carbon, or more preferably a superactivated carbon, or C60 "Bucky Ball" carbon or various mixtures of these or other carbons. The electrodes 4 and 5 may also additionally contain platinum, or palladium, or nickel catalyst or their mixtures, and an ion conductive polymer, such as Nafion. The current collectors 1 and 2 may be constructed from stainless steel, nickel, or carbon, or other electrically conductive and corrosion resistant materials, preferably in the form of a solid sheet, plate or mesh screen, woven or non-woven, such as a nickel coated (or plated) carbon fiber non-woven fabric, but any other forms and shapes of said materials are useable.

Said battery cell may have also a base frame 24. The current collectors 1 and 2 have positive and negative wire terminals 27 and 28 and the charging electrodes 8 and 9 have positive and negative terminals 25 and 26. The battery cell may be electrically connected through terminals 27 and 28 to an appliance, such as a motor 19 which is controlled by the switch 20.

The charging electrodes 8 and 9 with terminals 25 and 26 may be electrically connected to a direct current (D.C.) charger 16 for charging the cell, which is controlled by a switch or relay 32.

The electrodes 8 and 9 may be constructed of stainless steel, or nickel, or carbon, or a metal plated carbon and preferably metal plated hard carbon foam, or have fins to maximize their surface area. All the terminals are hermetically sealed at the through-points in the housing shells 6 and 7, as well as the preferably self gasketing membrane 3 is hermetically sealed all around the joint of shells 6 and 7. The electrodes 8 and 9 are submerged in a liquid electrolyte 33, which is confined in chambers 10 and 11, and in the interconnecting tunnel tube 13, which maintains an even level in both chambers.

The electrolyte may be a mixture of water with an acid, such as sulphuric acid or phosphoric acid or a base, alkaline or alkali, such as potassium hydroxide or a salt, and/or an antifreeze agent may be added.

The electrolyte level may be checked through the clear tube 31, which may be also used as electrolyte filler tube. To accommodate proper filling of the electrolyte, the vents 34 and 35 must be opened during filling.

The membrane 3 may be well known proton exchange membrane from a fuel cell, constructed from a Nafion film treated with an acid, or preferably a membrane of a sandwich construction comprising two layers 11A and 12 of microporous Teflon (polytetrafluoroethylene) sheets, which will not allow a liquid, such as an electrolyte or water to go through, but will allow gases, vapors and ions of hydrogen to go through and between said layers 11A and 12 may be sandwiched a fibrous porous structure sheet or net 34A, preferably a non-woven fabric of teflon fibers or other electrically insulating fibers, including glass, ceramic and plastic fibers, such as polyester or polypropylene fibers. Said fibrous structure 34A is saturated and wetted by an ion conductive liquid electrolyte and serves as a carrier wick or holder of the electrolyte.

The sheet layers 11A and 12 are larger then fibrous sheet 34A, and maybe heat sealed together, enclosing completely said sheet 34A (like in a bag). The sheets 11A and 12 are also self-gasketing—that is, their pores will close under pressure and seal all the liquids between them. The fibrous sheet 34A may be also replaced by a liquid electrolyte only. If the sheet 34A is used, it may be also dipped into the electrolyte 33 at the bottom of the chambers 10 and 11 and it will serve as a wick for wetting the whole membrane 3 (not shown).

The liquid electrolyte in the membrane 3 serves as a barrier, preventing the mixing of hydrogen and oxygen when battery cell is not in use. Also the carbons trap both gases separately.

The electrodes 4 and 5 containing preferably superactivated carbon powder may be also reinforced by a hard carbon open cell foam or other porous structure with large pores filled with the activated carbon powder. The hard carbon foam may be also nickel plated, or other metal plated and connected to the current collectors 1 and 2, to improve conductivity.

The simplified battery cell functions are as follows: Upon connecting the electrical charger 16 to the battery cell 1A as shown, the direct electric current will split the water contained in the electrolyte 33 into hydrogen at the negative electrode 9, and into oxygen at the positive electrode 8 by electrolysis of the water.

Both gases will rise separately through hard porous sponges 14 and 15 into carbon electrodes 4 and 5 and will get absorbed into the activated carbon powder of the electrodes. To purge the air from the electrodes by the flow of both gases, the vents 34 and 35 must be opened and used up water from the electrolyte 33 must be replenished through the tube 31. When the activated carbon electrodes 4 and 5 are fully saturated with hydrogen and oxygen and the electrolyte level drops under the electrodes 8 and 9 and the vents 34 and 35 are closed, the battery cell 1A is fully charged.

The power cut off pressure sensors 29 and 30 will disconnect the charger 16 through the switch 32 for safety.

When an electric load is connected to the battery cell electrodes 4 and 5 through the terminals 27 and 28, such as a motor 19 through the switch 20, the flow of hydrogen ions will go from the electrode 5 through the membrane 3 to the electrode 4 and will combine with the oxygen to produce water. The water will flow by gravity through the hard porous sponge 15 into the electrolyte chamber 10 and through the tube 13 will also flow into the chamber 11.

When all the hydrogen and oxygen gases are consumed and converted into the water, the battery cell is fully discharged and is ready again for recharging through the electrodes 8 and 9, by repeating the charging process is described above, except the purging of the air is not necessary.

Figure 4:
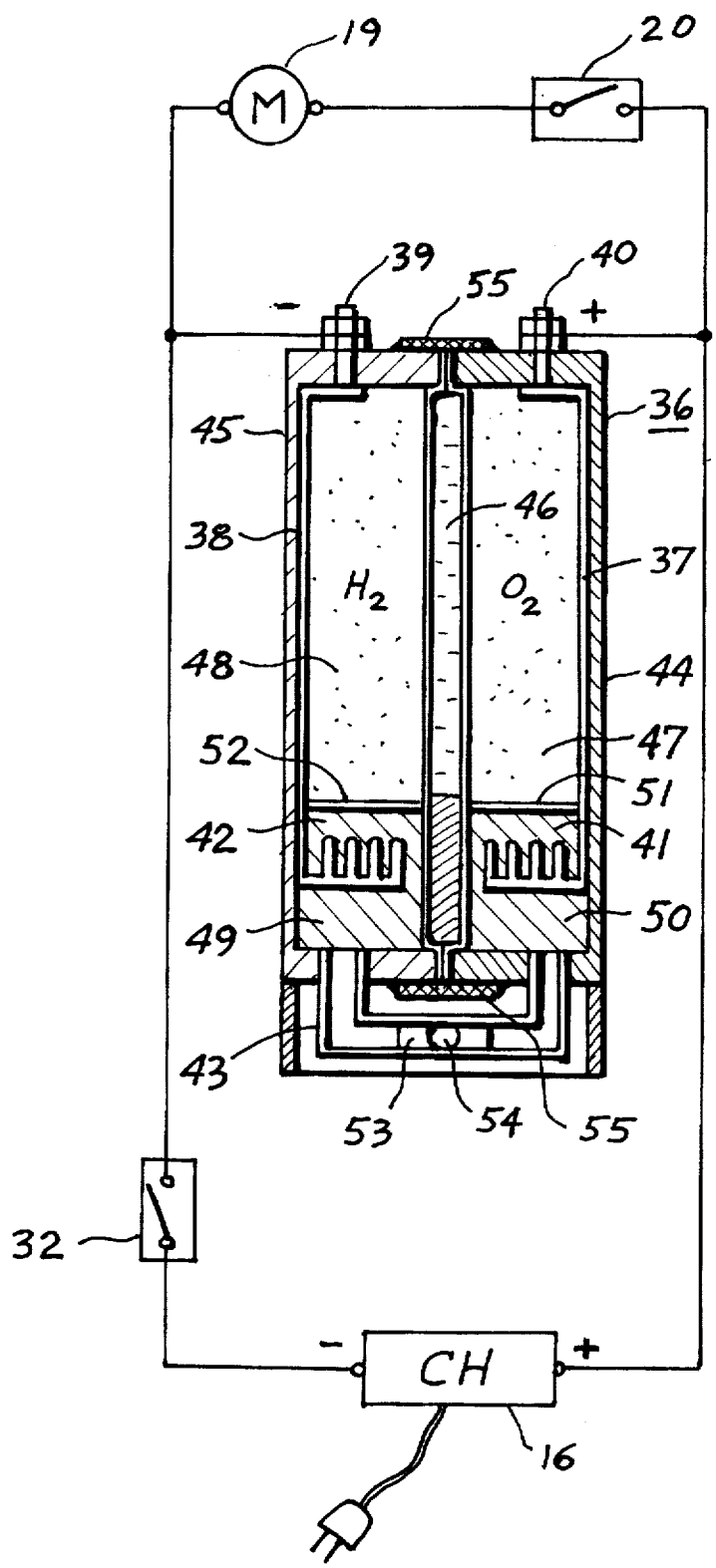
FIG. 4 is a vertical sectional schematic view of another embodiment of the hydrogen battery cell of the invention, showing locations of various components and combined current collectors with charging electrodes, as well as the simplified housing assembly.

An alterned rechargeable hydrogen/oxygen battery cell, which is another embodiment of the invention is shown in FIG. 4, in which said battery cell 36 has two current collectors 37 and 38 dipped into the electrolyte at the bottom of the cell and thus said collectors serve also as "charging" electrodes. The cell 36 may be then discharged and charged through the same terminals 39 and 40.

To prevent splashing of the electrolyte, the electrolyte chambers 41 and 42 may be filled with highly porous, open cell electrically non-conductive sponges 49 and 50. The connecting tube 43 may be filled with glass fibers porous structure 53 to prevent hydrogen and oxygen mixing. The housing shells 44 and 45 may be of electrically non-conductive material of a honeycomb sandwich construction and may be nickel or other metal plated inside, to seal hydrogen and oxygen gases, but said metal coatings (platings) of the shells must be separated by the self-gasketing and electrically insulating membrane 46, which may be identical with the described membrane 3. Between the electrodes 47 and 48, which may be identical as described electrodes 4 and 5, and the sponges 49 and 50 may be also inserted fine, but porous screens or sieves 51 and 52, permitting gases and water through, but preventing carbon dropping into the electrolyte. The filling and indicator tube 54, shown partially, may be identical with the tube 31, as shown in FIG. 1.

An electrically insulating seal strip 55 may replace bolts 21 (shown in FIG. 1), and may be adhesively bonded or welded to the shells 44 and 45 all around, after compressing the shells together and sealing (trapping) thus membrane 46 all around between the shells.

All other features and materials of components may be identical as described above in the cell 1A.

Also, the electrodes 47 and 48 may have a plurality of porous current collectors in vertical or horizontal layers or in any direction, such as carbon fibers or metal plated carbon fibers randomly distributed or as spaced sheets of carbon fabric or a fibrous space structure. Other fibers such as polymer fibers "metalized" or coated with a metal, such as nickel are also useful, creating a porous composite with a carbon powder matrix (not shown). The electrodes 47 and 48 may also additionally contain an ion conducting polymer, such as well known Nafion.

Figure 6:
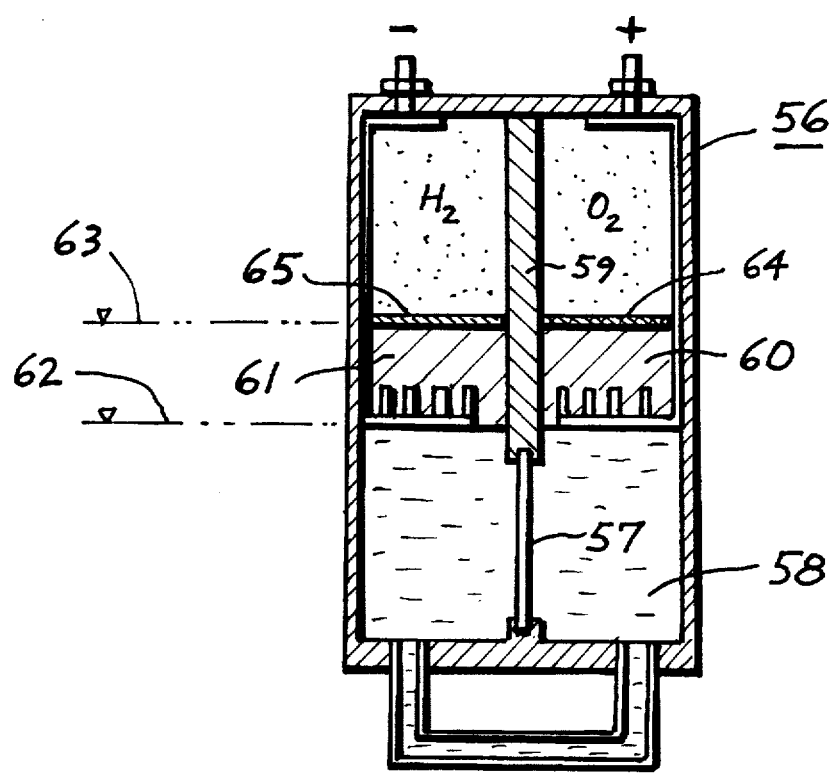
FIG. 6 is a vertical sectional schematic view of another embodiment of the hydrogen battery cell of the invention, showing fully submerged ion conducting membranes in a water based electrolyte at the bottom of the cell and two electrodes at the top separated by an insulating solid wall.

Another alterned rechargeable hydrogen/oxygen battery cell 56, which is another embodiment of the invention is shown in FIG. 6, which is a sectional view, and in which the membrane 57 is fully submerged in the electrolyte 58 and the dividing wall 59 separates the positive and negative electrodes, which are substantially similar to the above described electrodes, except sponges 60 and 61 and sieves 64 and 65 are electrically conductive and are also submerged in the electrolyte 58, which level fluctuates according to the state of discharge or charge, between the levels 62 and 63. During the discharge, the flow of hydrogen ions goes downward and then through the electrolyte 58 and the membrane 57 to the oxygen (+) electrode to produce water, which drops into the electrolyte 58. All other parts may be identical as was described.

Figure 5:
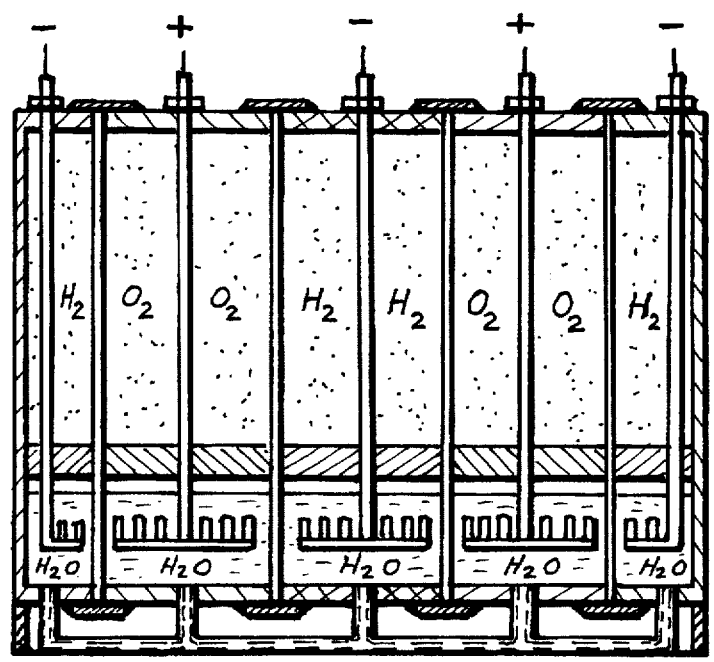
FIG. 5 is a vertical sectional schematic view of another embodiment of the hydrogen battery of the invention, showing plurality of bi-cells sharing current collectors and electrodes.

A plurality of the above described cells 1A and/or 36 and/or 56 may be electrically connected in series and/or in parallel to create a battery with a desired voltage and amperage. To further reduce weight of the battery it may be desirable to create a multiple bi-cell construction of the battery, as shown in FIG. 5, which is another embodiment of the invention, and in which the adjacent cells share the negative and the positive electrodes and their current collectors. The housings of the cells are like tubular segments tied together and they are trapping between them the ion conductive membranes as shown. All the other parts may be identical as was described. The oxygen in the cells may be also replaced by air but the oxygen is preferred.

Because the hydrogen and oxygen produce one of the highest amount of energy per unit of weight of all known chemical substances (approximately 3000 wh/kg), the resulting rechargeable battery cells or batteries have also very high specific or gravimetric energy density. An influencing lightweight factor in the above described construction is also the use of mostly carbon and especially super-activated carbon for electrodes gas absorbing material as well as the use of lightweight polymer, such as polyethylene or polypropylene, and honeycomb sandwich sheets for the housing of the cells.

Even if said electrolysis of water may not be the most energy efficient way to charge the battery, the resulting lightweight and high gravimetric energy density battery will make possible huge increase in the range of electric vehicles as compared to the prior art electric vehicles and the cost of charging may be reduced, or minimized, by using solar and wind power or other renewable sources of energy. All this will make the electric vehicles practical. The described battery is also very economical to manufacture due to abundance of carbon, water and polymeric materials, which are also environmentally friendly materials. It has been found that the hydrogen and carbon are also very good for battery cycling, and that over 5000 cycles can be achieved.

The described battery cell or battery may be also referred to as the "hydrogen-ion", or "hydrogen-carbon", or "hydrogenoxygen" battery.

Accordingly, the hydrogen based battery of high gravimetric energy and power density and high cycle life has been described with which the objects of the invention are achieved.

I claim:

1. A hydrogen ion based battery cell which comprises:
two electrodes containing metal current collectors and porous carbons with a catalyst, in which said carbons are saturated, one with hydrogen and the other with oxygen, an ion conducting membrane of sandwich construction, having a liquid electrolyte trapped between two porous, electrically non conductive sheets, which are ionically permeable, but not liquid permeable and said membrane is located substantially in vertical position between said electrodes, a liquid electrolyte contained in two separate chambers under said electrodes and said chambers are connected by a tube or tunnel to keep said electrolyte in substantial equilibrium in both chambers, two horizontal filters permeable by liquids and gases located under said electrodes and separating said carbons and catalyst of the electrodes from said electrolyte, two additional electrodes submerged in said electrolyte separately in said electrolyte chambers, and an electrically insulating, gas and liquid sealing housing, which encompasses all said components and is divided by said membrane into two halves and said halves are hermetically sealed to said membrane.

2. A hydrogen ion based battery cell as described in claim 1, in which said electrodes carbons are activated carbon, superactivated carbon, C60 "Bucky balls" carbon and carbon black individually, or as a mixture.

3. A hydrogen ion based battery cell as described in claim 1, in which said electrodes catalyst is platinum, palladium or nickel, individually or as a mixture.

4. A hydrogen ion based battery cell as described in claim 1, in which said membrane sheets are made of microporous polytetrafluoroethylene.

5. A hydrogen ion based battery cell as described in claim 1, in which said electrolytes contain water and an acid.

6. A hydrogen ion based battery cell as described in claim 1, in which said electrolytes contain water and a salt.

7. A hydrogen ion based battery cell as described in claim 1, in which said electrolytes contain water and a base.

8. A hydrogen ion based battery cell as described in claim 7, in which said base is potassium hydroxide.

9. A hydrogen ion based battery cell as described in claim 1, in which said current collectors and/or said additional electrodes are made of a metal plated carbon fiber net.

10. A hydrogen ion based battery cell as described in claim 1, in which said current collectors and/or said additional electrodes are made of a metal plated polymer fiber fabric net.

11. A hydrogen ion based battery cell as described in claim 1, in which said current collectors and/or said additional electrodes are made of carbon.

12. A hydrogen ion based, battery cell as described in claim 1, in which said horizontal filters are made of a ceramic sponge and a porous membrane.

13. A hydrogen ion based battery cell as described in claim 1, in which said oxygen is replaced by air.

14. A hydrogen ion based battery cell as described in claims 1 or 13, which are rechargeable by an electrolysis of water contained in said electrolyte and in which said hydrogen and oxygen produced by said electrolysis rise and get absorbed into said carbon electrodes.

15. A hydrogen ion based battery cell as described in claim 1, in which water produced during discharge flows by gravity into said electrolyte chambers under said electrodes.

16. A hydrogen ion based battery which has cells as described in claim 1 electrically connected in series and/or in parallel.

17. A hydrogen ion based battery as described in claim 16, which has bi-cell construction of said cells.

18. A hydrogen ion based battery cell as described in claim 1, in which said housing is made of honeycomb sandwich polymeric material.

19. A hydrogen ion based battery cell as described in claim 1, in which said current collectors and said additional electrodes of the same polarity are electrically connected.

20. A hydrogen ion based battery cell as described in claim 1, in which said membrane is submerged in said electrolyte at the bottom of said cell and said electrodes above are separated by a solid electrically non-conductive wall.

21. A hydrogen ion based battery cell as described in claim 1, in which said membrane sheets are made of Nafion.

22. A hydrogen ion based battery cell as described in claim 1, in which said current collectors and/or additional electrodes are made of metal plated or metalized carbon.

23. A hydrogen ion based battery cell as described in claim 1, in which said housing is made of metal plated or metalized polymeric material.

24. A hydrogen-oxygen based battery cell as described in claim 1.

25. A hydrogen ion based battery cell as described in claim 1, in which said electrodes additionally contain an ion conductive polymer.

* * * * *